(12) United States Patent
Becker et al.

(10) Patent No.: US 7,374,244 B2
(45) Date of Patent: May 20, 2008

(54) VEHICLE SEAT WITH A SEAT PART, A SEAT BACK AND AN UNDERFRAME

(75) Inventors: Burckhard Becker, Solingen (DE); Wilfried Beneker, Leichlingen (DE)

(73) Assignee: C. Rob. Hammerstein GmbH & Co. KG, Solingen (DE)

( * ) Notice: Subject to any disclaimer, the term of this patent is extended or adjusted under 35 U.S.C. 154(b) by 52 days.

(21) Appl. No.: 11/489,332

(22) Filed: Jul. 19, 2006

(65) Prior Publication Data

US 2007/0018492 A1   Jan. 25, 2007

(30) Foreign Application Priority Data

Jul. 22, 2005   (DE)   ..................... 10 2005 034 961

(51) Int. Cl.
*B60N 2/20* (2006.01)
(52) U.S. Cl. .................................. 297/341; 297/378.12
(58) Field of Classification Search ........... 297/378.12, 297/316, 340, 341, 317, 321, 322, 318
See application file for complete search history.

(56) References Cited

U.S. PATENT DOCUMENTS

| | | | |
|---|---|---|---|
| 3,695,688 A * | 10/1972 | Wize ............................ 297/92 |
| 5,454,624 A * | 10/1995 | Anglade et al. ....... 297/354.13 |
| 5,482,349 A * | 1/1996 | Richter et al. ................ 297/15 |
| 6,082,805 A * | 7/2000 | Gray et al. .............. 296/65.09 |
| 6,152,533 A * | 11/2000 | Smuk .......................... 297/341 |
| 6,371,558 B1 * | 4/2002 | Couasnon ................ 297/378.1 |
| 6,688,696 B2 * | 2/2004 | Brush et al. ............. 297/378.1 |
| 6,971,700 B2 * | 12/2005 | Blanger et al. .......... 296/65.16 |

* cited by examiner

*Primary Examiner*—Milton Nelson, Jr.
(74) *Attorney, Agent, or Firm*—McCarter & English, LLP

(57) ABSTRACT

A vehicle seat has a seat part, a seat back and an underframe. The seat part is connected to the underframe by a front guide member. The seat back is hinged to the underframe by a seat back hinge. A stop device comprising a release lever is associated with the seat back hinge. There is provided a connecting rod that is hinged to the seat part by a front connecting rod joint and to the seat back by a rear connecting rod joint.

12 Claims, 5 Drawing Sheets

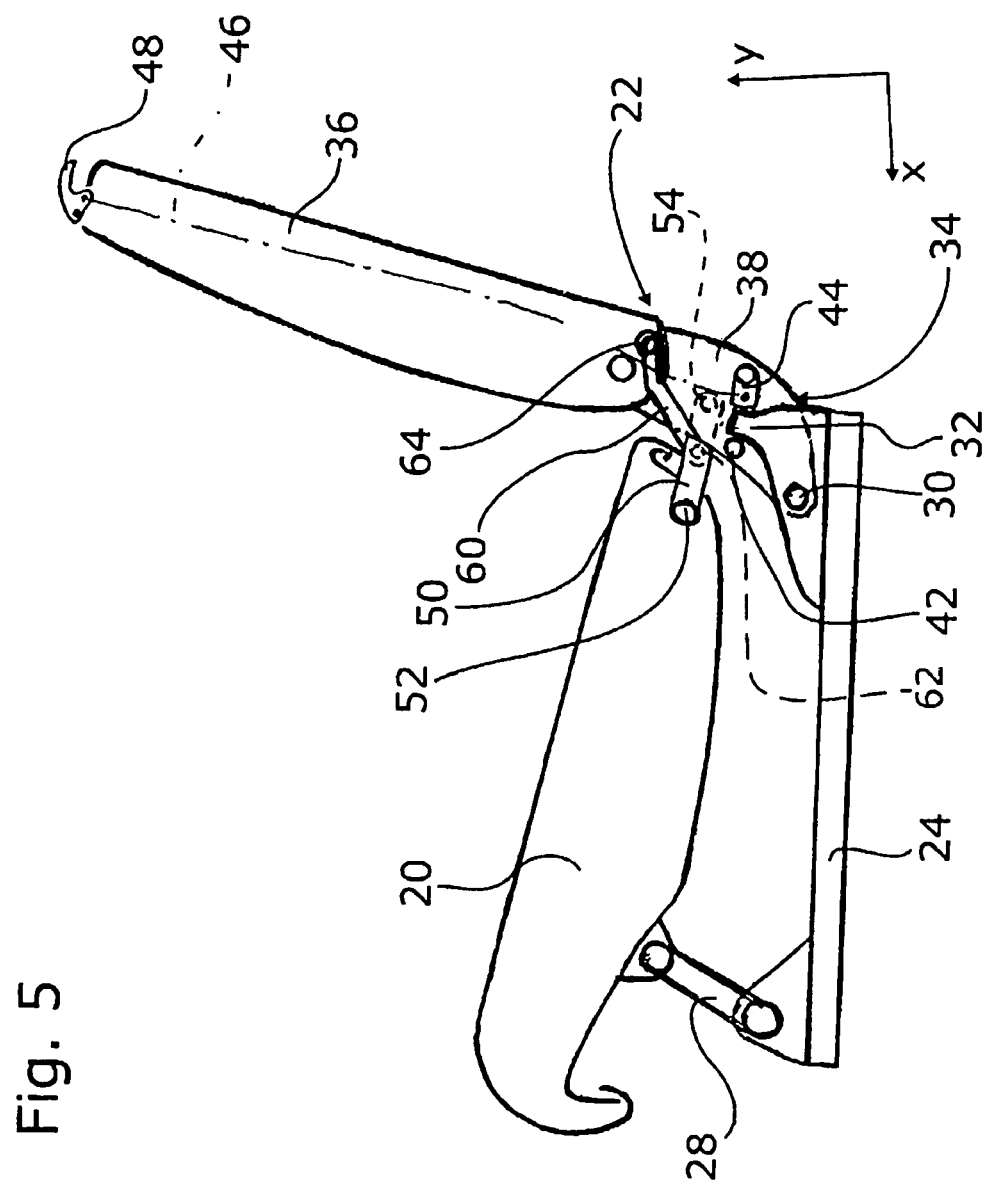

VEHICLE SEAT WITH A SEAT PART, A SEAT BACK AND AN UNDERFRAME

CROSS-REFERENCE TO RELATED APPLICATIONS

This application claims priority to German Application No. DE102005034961.7, filed Jul. 22, 2005, the contents of which are expressly incorporated by reference in their entirety as part of the present disclosure.

BACKGROUND

The invention relates to a vehicle seat having a seat part, a seat back and an underframe, the seat part being connected to the underframe in a front guide member.

In motor vehicles, which have but one door on either side and additionally comprise back seats, vehicle seats are required that can be readily moved forward to facilitate access to the back seats. The seat adjustment should remain unchanged after the seat has been moved. Similar demands are placed on seats of a second seat row to facilitate access to a third seat row.

In accordance with prior art, seat parts are mostly connected to an underframe via two front supporting members and two rear supporting members and hinged thereto. A four-bar linkage is thus obtained. It is immobilized by a stop device and usually is adjustable.

In view of the vehicle seat of the type mentioned herein above, the problem underlying the invention was to develop this vehicle seat in another direction, thus providing a new approach for facilitating its construction over prior implementations.

SUMMARY

This problem is solved by introducing a vehicle seat comprising a seat part, a seat back, and an underframe. A front guide member connects the seat part to the underframe and a seat back hinge hinges the seat back to the underframe. A stop device comprising a release lever is associated with the seat back hinge. The vehicle seat further comprises a connecting rod hinged to the seat part and the seat back, wherein a front connecting rod joint hinges the connecting rod to the seat part and a rear connecting rod joint hinges the connecting rod to the seat back.

In this vehicle seat, the seat part is carried in its rear portion by the seat back through the connecting rod. As opposed to the hereto before usual seats, no rear supporting member for abutting the seat part against the underframe is provided. The connecting rod allows for new movement. Through the connecting rod, the seat part may now be moved at the same time as the seat back is being folded forward. The kinematic conditions for forward movement are favorable. There are various kinematic possibilities to choose from by varying the position of the connecting rod joints.

Now, the seat back is hinged directly to the underframe and no longer, as it is usually the case on vehicle seats, to the seat part, that is to say to a seat carrier of the seat part.

In an advantageous developed implementation, there is provided a supporting connecting rod that comprises a lower and an upper joint. At its lower joint, it is hinged to the connecting rod, namely between the two connecting rod joints. The upper joint is hinged to the seat back. This supporting connecting rod controls and retains the connecting rod. Various kinematic possibilities can be adjusted by varying the position of the upper and the lower joint.

In a preferred developed implementation, the front guide has a pair of front supporting members, namely a left front supporting member and a right front supporting member. Such type supporting members are generally to be found in prior art. If such type supporting members are used, the arrangement consisting of the seat part, the front supporting members, the underframe, the seat back and the connecting rod forms a five-bar linkage, meaning an arrangement with five joints. One of these joints, the seat back hinge, is optionally locked by the stop device. Another joint, the rear connecting rod joint, is fixed by the supporting connecting rod. Thus, the arrangement described is secured.

In a preferred implementation, the seat back has a lower support part and a seat back part. Between the two parts of the seat back, there is provided a hinge mounting. For this purpose, a prior art hinge mounting such as a motorized one and/or one with a wobble gear, is used. Now, the seat back part may be adjusted in two different ways—on the one side it may be adjusted together with the lower support part by releasing the stop device and on the other side it may be adjusted by adjusting the hinge mounting relative to the lower support part. The adjustment in the seat back hinge, which is possible after the stop device has been released, serves to rapidly move the seat back, and concurrently therewith the seat part, forward. The adjustment of the seat back hinge serves to provide convenience in the normal position of utilization and corresponds to the usual adjustment of a seat back part as it may be found on normal vehicle seats.

In a preferred developed implementation of the above-mentioned two-part seat back, the upper joint of the supporting connecting rod is arranged on the seat back part. Although this upper joint may, in principle, also be arranged on the lower support part, having it arranged on the seat back part makes it possible to change the incline of the seat back part when adjusting the hinge mounting and also influence the position of the connecting rod and, as a result thereof, of the seat part. Desired kinematic conditions can be adjusted by judiciously choosing the point at which the upper joint is hinged to the back part. If the upper joint is substantially disposed above or beneath the axle of the hinge mounting, an adjustment of the incline of the seat back part has little influence on the horizontal position and the vertical position of the seat part. The greater the spacing between the upper joint and the axle of the hinge mounting as measured in the x direction, the more the position of the connecting rod will be changed through the supporting connecting rod when the incline of the seat back part is adjusted, that is to say, the more the horizontal position of the seat part will be changed. By forwardly displacing the hinge mounting it is, for example, possible to raise or lower the rear portion of the seat part depending on the location of the upper hinge point. If the hinge point is located before the axle of the hinge mounting when viewed in the positive x direction, the seat part is lowered in its rear portion when the seat back part is tilted forward in the hinge mounting. If the upper joint is located behind the axle of the hinge mounting when viewed in the x direction, the seat part is raised in its rear portion when the seat back part is tilted forward. The rear portion of the seat part is not only caused to move upward and downward, it is also, at the same time, displaced a certain distance in the x direction.

The disengagement lever is preferably disposed on the seat back part of the seat back. It is advantageous to dispose the lever as high as possible in proximity to an upper edge of the seat back part so that the lever is readily accessible to the user. Actuation of the disengagement lever causes the stop device to come free and, as a result thereof, the seat is moved forward swiftly to facilitate access to a seat row located behind.

Other features and advantages of the invention will become more apparent upon reviewing the appended claims and the following non restrictive description of three exemplary embodiments of the invention, given by way of example only with reference to the drawing.

BRIEF DESCRIPTION OF THE DRAWINGS

In the drawing:

FIG. 5 is a side view of a seat similar to FIG. 1, with an upper joint of a supporting connecting rod being now disposed behind an axle of a hinge mounting when viewed in the x direction.

DETAILED DESCRIPTION

Figure 1:
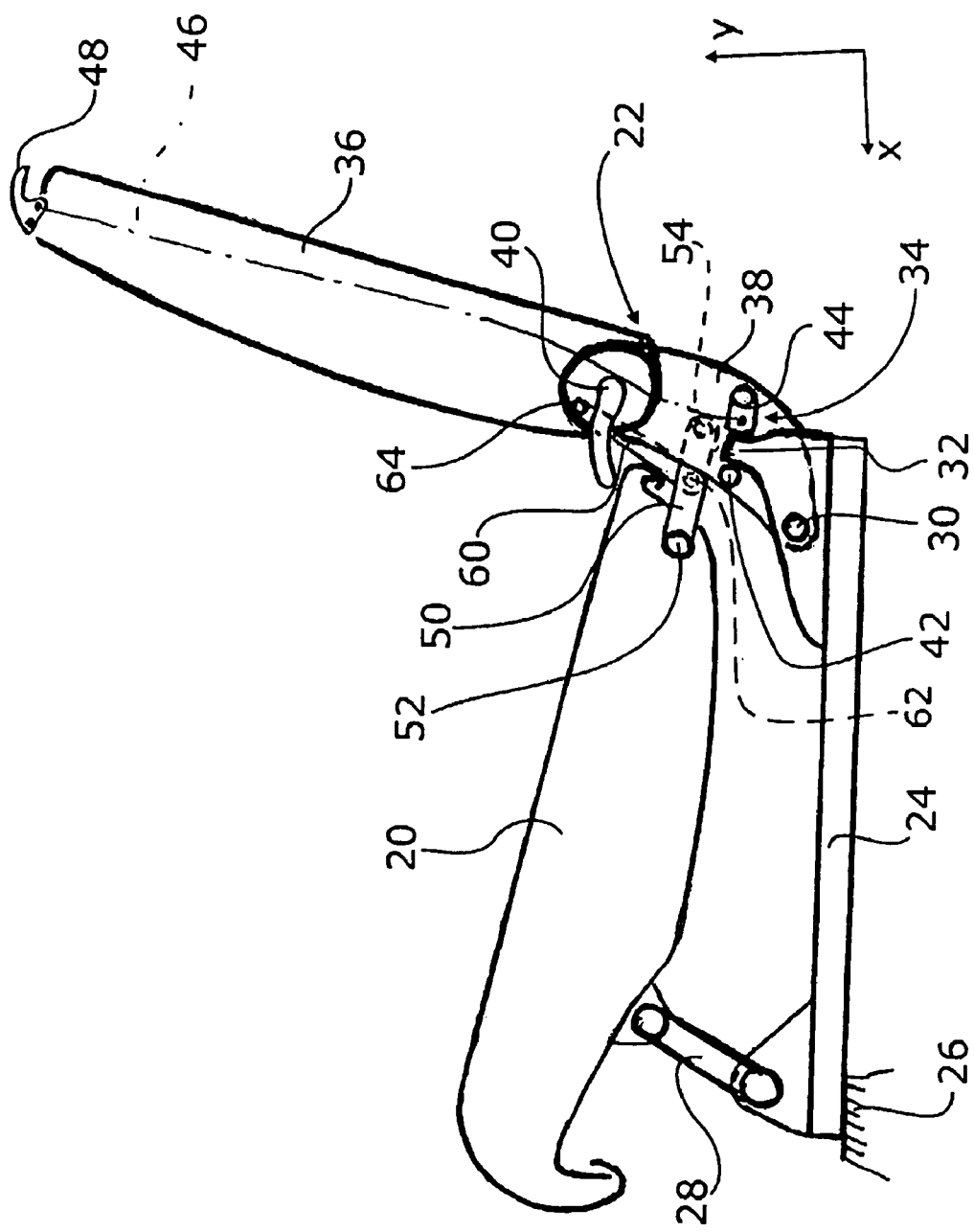
FIG. 1 is a schematic side view of a vehicle seat, with the seat being in the normal position of utilization.

The vehicle seat in accordance with one of the three exemplary embodiments has a seat part 20, a seat back 22 and an underframe 24. The underframe is designed to be connected to an underbody 26 of a motor vehicle seat that has not been illustrated in closer detail herein. The underframe preferably has longitudinal guides for forward and backward adjustment of the seat's position, meaning substantially in the x direction.

The seat part 20 is connected to the underframe 24 by a front guide member. In all of the exemplary embodiments, front supporting members 28 which are respectively hinge-linked in a lower and in an upper joint region are provided for this purpose. In the practical implementation, there is provided a left front supporting member and a right front supporting member.

The seat part 20 includes a padding and a seat carrier, which are not shown herein in greater detail.

The seat back 22 is hinge-linked to the underframe 24 through a seat back hinge 30. The underframe 24 has, like for the hinge connection to the front supporting members 28, flanges upstanding upward, meaning substantially in the z direction, for fastening the joints. At the rear flange, which receives the seat back hinge 30, there formed a lug 32 which is part of a stop device 34 that is associated with the seat back hinge 30 which it locks.

In all the exemplary embodiments shown, the seat back is composed of a seat back part 36 and of a lower support part 38. The two parts are connected together by a hinge mounting 40. This hinge mounting 40 serves to adjust the incline of the seat back part with respect to the lower support part 38. Prior art mountings can be used as the hinge mountings.

Figure 2:
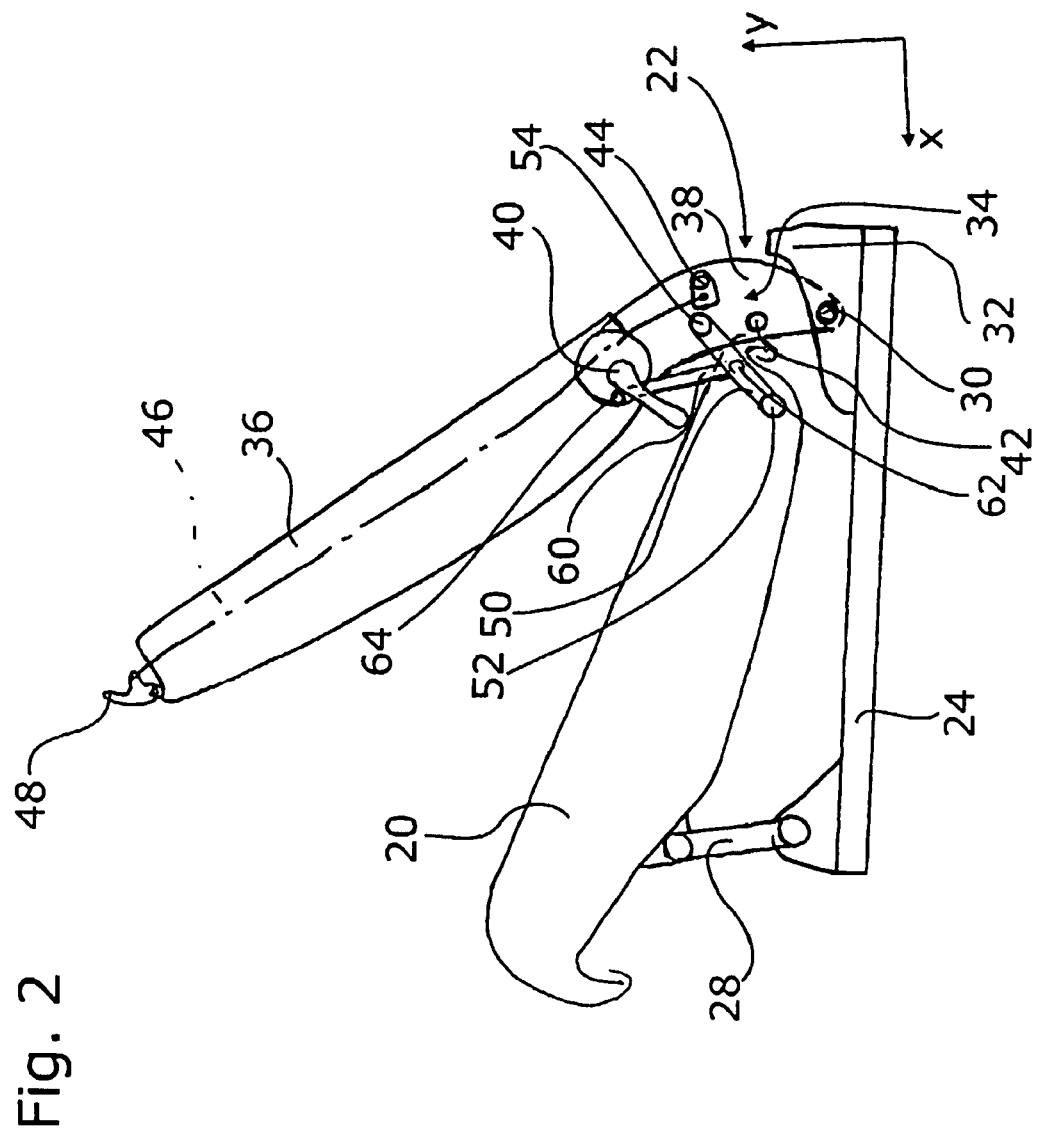
FIG. 2 shows the vehicle seat of FIG. 1, with the stop device having now come free and the seat being in a forwardly moved position.

The stop device 34 is operative between the lower support part 38 and the underframe 24. It has a bolt 42 that is disposed on the lower support part 38 in front of lug 32 when viewed in the x direction and that, in the normal position of utilization as shown in the FIGS. 1, 4 and 5, fits against a front face of lug 32 which extends substantially in the z direction. On the opposite side of lug 32 when viewed in the x direction, a stop lever 44 is pivotally hinged to the lower support part 38. The FIGS. 1 and 3 through 5 show this lever in its stopping position. In FIG. 2, it is in the release portion. The stop lever 44 is connected to a disengagement lever 48 through a driver mechanism configured to be a Bowden cable 46. The disengagement lever is disposed in proximity to an upper edge of the seat back part 36 of the seat back 22. In FIG. 1 it is in the position of rest, in FIG. 2, in the actuated, pulled position. This latter position must be actively maintained by a user since the disengagement lever 48 is biased in the position shown in FIG. 1 by suitable means that have not been illustrated herein.

Reviewing FIGS. 1 and 2 concurrently, it can be seen how forward movement of the seat back 32 about the seat back hinge 30 takes place: if the release lever 48 is actuated, the stop lever 48 comes free from the lug 32. Now, the seat back 22 may be pivoted forward about the seat back hinge 30 into the position shown in FIG. 2 and possibly even farther forward if desired. It is possible to provide for a limit stop for limiting the forward pivoting movement toward the front for such a fast forward pivoting movement. It is also possible that the seat back 22 be immobilized in the forward pivoted position, for example in the position shown in FIG. 2, so that it remains pivoted forward and needs only come free on order to be moved back to the normal position of utilization shown in FIG. 1.

In its rear portion, the seat part 20 is hinge-linked to the lower support part 38 of the seat back 22 through a connecting rod 50. For this purpose, a front connecting rod joint 52 for hinge connection to the seat part 20 and a rear connecting joint 54 for hinge connection to the seat back 22 are provided. In the normal position of utilization, these connecting rod joints 52, 54 are substantially located on a parallel with respect to the x axis. The two connecting rod joints 52, 54 are spaced apart, the spacing corresponding approximately to 10 to 25%, and in one embodiment, 15 to 20%, of the length of the seat part 20. It further appears that the spacing between the two connecting rod joints 52, 54 substantially corresponds to the spacing of the two joint regions of the front supporting members 28, but for a difference of about +/−20%. In the normal position of utilization as shown in FIG. 1, the rear connecting rod hinge 54 is located at least 1 mm above the upper end of the lug 32. The bolt 42, the rear connecting rod joint 54 and the stop lever 44 lie on an approximately isosceles triangle. Likewise, the two connecting rod joints 52, 54 and the seat back hinge 30 lie on an approximately equilateral triangle. The connecting rod 50, the supporting connecting rod 60, the seat back part 36 and the lower support part 38 form a four-bar linkage. This linkage is locked by hinge mounting 40.

Figure 3:
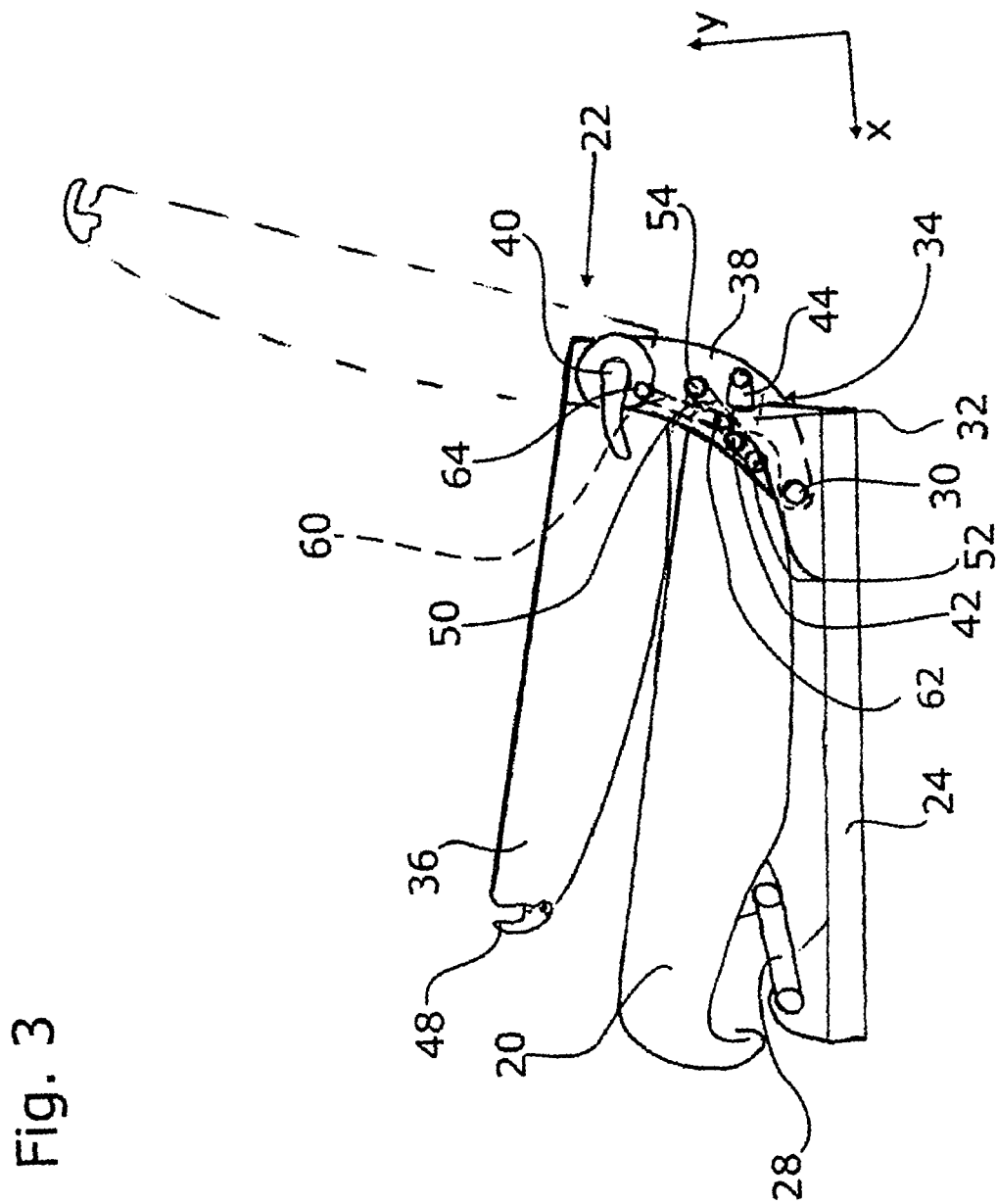
FIG. 3 is a side view of the seat of FIG. 1, with the stop device having not come free but with a hinge mounting of the seat back being displaced a distance such that the seat back has almost reached the horizontal position in the x direction.

A supporting connecting rod 60 is associated with the connecting rod 50 and is approximately the same length. It has a lower joint 62 by means of which it is hinged to the connecting rod 50 and between the two connecting rod joints 52, 54. This lower joint 62 may also have another position on the connecting rod 50 insofar as this position lies between the two connecting rod joints 52, 54. The supporting connecting rod 60 further has an upper joint 64. This upper joint is disposed, preferably hinged, to the seat back part 36 in all of the exemplary embodiments. Since the three exemplary embodiments differ in this respect, they will be discussed one by one:

In the exemplary embodiment shown in the FIGS. 1 through 3, the upper joint 64 of the supporting connecting rod 60 is located at an angle of about 45° between the x and the z axis above and in front of an axle of the hinge mounting 40 when the seat is in the illustrated position of utilization, meaning in the position shown in FIG. 1. The upper joint 64 is stationary with respect to the seat back part 36. If the hinge mounting 40 is adjusted, the incline of the seat back part 36 relative to the lower support part 38 is changed. At the same time, the lower joint 64 moves substantially downward, meaning in the negative z direction, but also slightly forward, meaning in the positive x direction. It reaches the position shown in FIG. 2. Via the supporting connecting rod 60, the hinge mounting has pushed the connecting rod 50 downward so that the front connecting rod joint 52 in particular has been moved downward. The seat part 20 has thus reached an inclined position as shown in FIG. 1. It has been slightly pushed forward so that the front supporting members 28, which are inclined backward at an angle of about 60° in the position of utilization, are now inclined at least one degree forward, now being approximately in the z direction. Meaning, the seat part 20 is moved forward in FIG. 2.

If the stop device 34 is not caused to come free, but the hinge mounting 40 is actuated instead, the seat back part 36 can be pivoted forward as far as practicable. The position reached is shown in FIG. 3. The upper joint 64, which is fixedly associated with the seat back part 36, has moved together with the seat back part 36. Further, the position of the supporting connecting rod 60 has changed as a result thereof and the supporting connecting rod has pushed the connecting rod 50 downward, so that the connecting rod 50 has now pivoted about 45° and is now inclined at an angle of about 45° to the x axis. As a result, the seat part 20 has been both pulled backward and moved downward. In the rear portion, the downward movement was due to the fact that the front connecting rod joint 52 is now considerably lower, meaning it has been pushed in closer proximity to the underframe 24. Moving the seat part 20 backward has caused the front supporting members 28 to pivot, they now have a much flatter orientation so that the seat part 20 has also been lowered in its front part. It becomes apparent that the kinematic condition has been chosen to cause the seat part 20 to be displaced in an almost parallel orientation, both downward and backward, starting from the position shown in FIG. 1.

FIG. 3 shows an extreme position as it may only be reached by adjusting the hinge mounting 40. Smaller adjustments of the hinge mounting 40 about the position of utilization shown in FIG. 1 are used to adjust the seat back part 36 into a convenient position. Such an adjustment also involves an adjustment of the seat part 20. This adjustment may allow for achieving the kinematic condition expected by the user. A tall user will in most cases displace the seat back part 36 further backward for example and will expect the seat part 20 to be lower. A shorter user will rather tend to adjust the seat back part 36 so as to be more upright and the seat part 24 can be raised thereby. A reverse kinematic condition is also possible, though.

Figure 4:
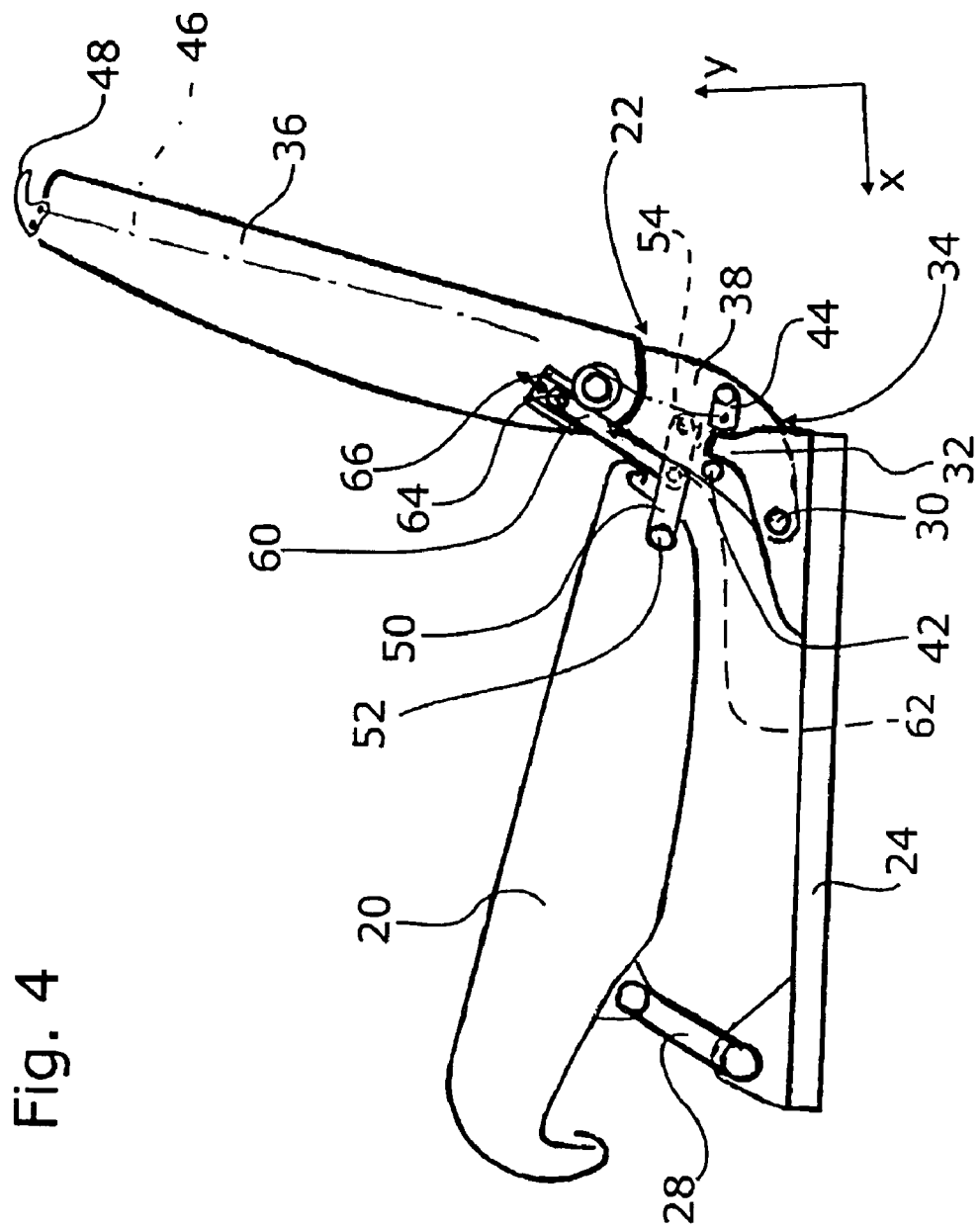
FIG. 4 is an illustration according to FIG. 1 for a second exemplary embodiment in which an adjusting device is now associated with an upper joint of a supporting connecting rod.

In the embodiment shown in FIG. 4, the upper joint 64 is retained and secured in a longitudinal guide 66 which acts as an adjustment mechanism. It is part of the seat back part 36. As a result, the position of the upper joint 64 may be adjusted pursuant to the double-headed arrow. This makes it possible to adjust the incline of the seat part 20, the latter being simultaneously displaced slightly in the x direction. Other adjusting devices such as prior art devices operating on an arch or on any other curve may be provided rather than the longitudinal guide 66 shown.

In the implementation shown in FIG. 5, the upper joint 64 is again fixedly associated to the seat back part 36; this time however, it is offset about 180° with respect to the axis of the hinge mounting 40 as compared to the first exemplary embodiment and positioned in the 5 o'clock position. Other kinematic conditions are thus obtained. If the seat back part 36 is now tilted forward, the seat part 20 is moved backward and is also slightly raised. It becomes apparent that the kinematic condition may be influenced as follows: if the distance between the upper joint 64 and the axis of the hinge mounting 40 increases, a pivoting movement of the seat back part 36 has a greater affect on the seat part 20. If the upper joint 64 is located above or beneath the axis of the hinge mounting 40 when viewed in the z direction, pivoting the seat back part 36 substantially causes the seat part 20 to be moved in the x direction and less in the z direction. Movement of the seat part 20 in the z direction is emphasized when the upper joint 64 is located in front or behind the axle of the hinge mounting 40, when viewed in the x direction. These considerations each apply on the basis of FIG. 1.

Rather than the front supporting members 28, a slideway may be provided between the underframe 24 and the seat part 20; other implementations of the front guide member are possible. Two front supporting members 28 and two coupling rods 50 carry the seat part 20. One connecting rod 50 is provided for each seat side. Other means for carrying the seat part 20 are not provided for.

As may be recognized by those skilled in the pertinent art based on the teachings herein, numerous changes and modifications may be made to the above-described vehicle seat without departing from the spirit and scope of the invention as defined in the appended claims. Accordingly, this detailed description is to be taken in an illustrative, as opposed to a limiting sense.

What is claimed is:
1. A vehicle seat comprising:
a seat part;
a seat back;
an underframe;
a front guide member connecting the seat part to the underframe;
a seat back hinge hinging the seat back to the underframe;
a stop device associated with the seat back hinge, the stop device comprising a release lever;
a connecting rod hinged to the seat part and the seat back, wherein a front connecting rod joint hinges the connecting rod to the seat part and a rear connecting rod joint hinges the connecting rod to the seat back, and
a supporting connecting rod that is hinged to the connecting rod between the front connecting rod joint and the rear connecting rod joint by a lower joint, and to the seat back by an upper joint.

2. The vehicle seat as set forth in claim 1, wherein the upper joint of the supporting connecting rod is disposed in an adjustment mechanism that is connected to the seat back so that the position of the upper joint relative to the seat back is adjustable.

3. The vehicle seat as set forth in claim 1, wherein the front guide member comprises a front supporting member hinged to the underframe in a lower joint region and to the seat part in an upper joint region.

4. The vehicle seat as set forth in claim 3, wherein the length of the front supporting member between the lower joint region and the upper joint region corresponds, with a difference of about +/−20%, to the length of the connecting rod between the front connecting rod joint and the rear connecting rod joint.

5. The vehicle seat as set forth in claim 1, wherein the seat back comprises a lower support part and a seat back part, the rear connecting rod joint and the seat back hinge being disposed on the lower support part, and there is provided a hinge mounting that is interposed between the lower support part and the seat back part, which enables the seat back part to be adjusted relative to the support part.

6. The vehicle seat as set forth in claim 5, wherein the connecting rod, the supporting connecting rod, the lower support part and the seat back part form a four-bar linkage that is secured by the hinge mounting.

7. The vehicle seat as set forth in claim 5, wherein the release lever is disposed on the seat back part.

8. The vehicle seat as set forth in claim 1, wherein the release lever is disposed on the seat back.

9. The vehicle seat as set forth in claim 1, wherein the front connecting rod joint and the rear connecting rod joint are spaced a distance apart that is about 10 to 25% of the length of the seat part.

10. The vehicle seat as set forth in claim 9, wherein the front connecting rod joint and the rear connecting rod joint are spaced a distance apart that is about 15 to 20% of the length of the seat part.

11. The vehicle seat as set forth in claim 1, wherein, when the vehicle seat is in a normal position, the supporting connecting rod is inclined at an angle greater than 45° to the connecting rod.

12. The vehicle seat as set forth in claim 11, wherein, when the vehicle seat is in the normal position, the supporting connecting rod is inclined at an angle greater than 60° to the connecting rod.

* * * * *